US008087087B1

(12) United States Patent
van Oorschot et al.

(10) Patent No.: US 8,087,087 B1
(45) Date of Patent: Dec. 27, 2011

(54) MANAGEMENT OF COMPUTER SECURITY EVENTS ACROSS DISTRIBUTED SYSTEMS

(75) Inventors: Johannes P. M. van Oorschot, Delft (NL); Emil S. A. Vogel, Delft (NL); Ide W. H. Nentjes, Den Hoorn (NL); Arthur W. Hillenaar, Schiedam (NL); Eddy Snoeck, BergschenHoek (NL); Gilles E. Houtekamer, Bergschenhoek (NL)

(73) Assignee: International Business Machines Corporation, Armonk, NY (US)

( * ) Notice: Subject to any disclaimer, the term of this patent is extended or adjusted under 35 U.S.C. 154(b) by 1883 days.

(21) Appl. No.: 10/455,940

(22) Filed: Jun. 6, 2003

Related U.S. Application Data

(60) Provisional application No. 60/386,780, filed on Jun. 6, 2002.

(51) Int. Cl.
*G06F 11/00* (2006.01)
(52) U.S. Cl. .............................................. 726/25; 726/1
(58) Field of Classification Search ................... 726/25, 726/1, 3, 6
See application file for complete search history.

(56) References Cited

U.S. PATENT DOCUMENTS

| 5,950,147 | A * | 9/1999 | Sarangapani et al. | 702/179 |
| 6,907,430 | B2 * | 6/2005 | Chong et al. | 707/100 |
| 2003/0097588 | A1 * | 5/2003 | Fischman et al. | 713/200 |
| 2003/0188189 | A1 * | 10/2003 | Desai et al. | 713/201 |
| 2005/0125259 | A1 * | 6/2005 | Annappindi | 705/4 |

OTHER PUBLICATIONS

Van Oorschot, Johannes P.M., "Security Monitoring in the Networked Open Systems World: Examining the Policy Game." *Technical Support*, Feb. 1999.

* cited by examiner

*Primary Examiner* — Samson Lemma
(74) *Attorney, Agent, or Firm* — DeLizio Gilliam, PLLC

(57) ABSTRACT

A computer receives a system event initiated by an initiating client associated with a user. The system event comprises a plurality of data elements associated with respective ones of a plurality of system event attributes. It is determined that the system event fails to conform to the security policy. A greatest of a plurality of significance factors assigned to a plurality of data groups that are associated with the plurality of data elements of the system event is determined. If the system event does not match a special attention rule, the greatest of the plurality of significance factors is assigned to the system event as a severity level. If the system event matches the special attentions rule, then a greater of the greatest of the plurality of significance factors and the pre-assigned severity level is assigned to the system event as a severity level.

24 Claims, 11 Drawing Sheets 2002-12-12 13:25:20

UTC,127.0.0.1,public,1.3.6.1.4.1.2620.1.1,127.0.0.1,6,0,1039700120,1.3.6.1.4.1.2620.1.1.11.0,D,12Dec2002 14:38:09 accept MACHINE03 <ELnk32 snmptrap pronto tcp src 111.111.111.111  dst 222.222.222.222.222 service 25 s_port 65160 len 60 rule 6

124

MANAGEMENT OF COMPUTER SECURITY EVENTS ACROSS DISTRIBUTED SYSTEMS

RELATED APPLICATIONS

This application claims the benefit of U.S. Provisional Application No. 60/386,780, filed Jun. 6, 2002.

BACKGROUND OF THE INVENTION

In computer systems, for example local area network and mainframe computer systems, event management systems are employed to record a variety of system events initiated by a user. Computer operating systems include basic capabilities for recording the various events in any of a number of log files. An operating system can be programmed to generate security alerts upon the occurrence of certain event. Although the logs and security alerts generated by the operating system represent a picture of the activity occurring within a system, that picture is somewhat limited in scope and functionality.

Event management tools provide additional capabilities beyond those made available by an operating system, or application running in the operating system environment. Such tools allow for higher-level management of the event logs and security alerts recorded and generated by the underlying operating system. In one example, namely the Consul/eAudit management tool suite available from Consul Risk Management B.V., Delft, The Netherlands, security logs and real-time security data recorded by the underlying operating systems, applications, or security point solutions, are translated into generalized security events, each event being characterized by five attributes, namely: "who" (the user initiating the event); "what" (the type of event that was initiated); "when" (the time at which the event occurred); "where" (the system or device on which the event occurred); and "on what" (the file, device, or setting that was accessed by the event). The generalized security events are managed by the event management tool to provide for a comprehensive security overview of activity within a given computer system. A forensic statement of the activity is generated, and the management tool can respond in a variety of ways including: immediate alerts to security personnel, offline generation of security reports, and the like.

With the growing popularity of the Internet, computer networks continue to become increasingly distributed, in the sense that users initiate events not only within a single computer system, but also across multiple interconnecting systems that utilize different operating systems. Hence, the event management tools currently available are unable to resolve attributes of events that are initiated remotely or acted upon remotely, i.e. external to a given system.

SUMMARY OF THE INVENTION

Embodiments of the inventive subject matter include a method for managing system events in a network. A computer receives a system event initiated by an initiating client associated with a user. The system event comprises a plurality of data elements associated with respective ones of a plurality of system event attributes. The plurality of data elements of the system event is evaluated against a security policy. It is determined that the system event fails to conform to the security policy for the user. The security policy defines permitted actions for different users in accordance with the plurality of system event attributes. A greatest of a plurality of significance factors assigned to a plurality of data groups that are associated with the plurality of data elements of the system event is determined. It is determined whether the system event matches a special attention rule in accordance with the plurality of data elements. The special attention rule defines a prohibited action. If the system event does not match the special attention rule and the system event fails the security policy, the greatest of the plurality of significance factors is assigned to the system event as a severity level. If the system event matches the special attentions rule and the system event fails the security policy, then the greatest of the plurality of significance factors is compared against a pre-assigned severity level that was pre-assigned to the special attention rule, and a greater of the greatest of the plurality of significance factors and the pre-assigned severity level is assigned to the system event as a severity level.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
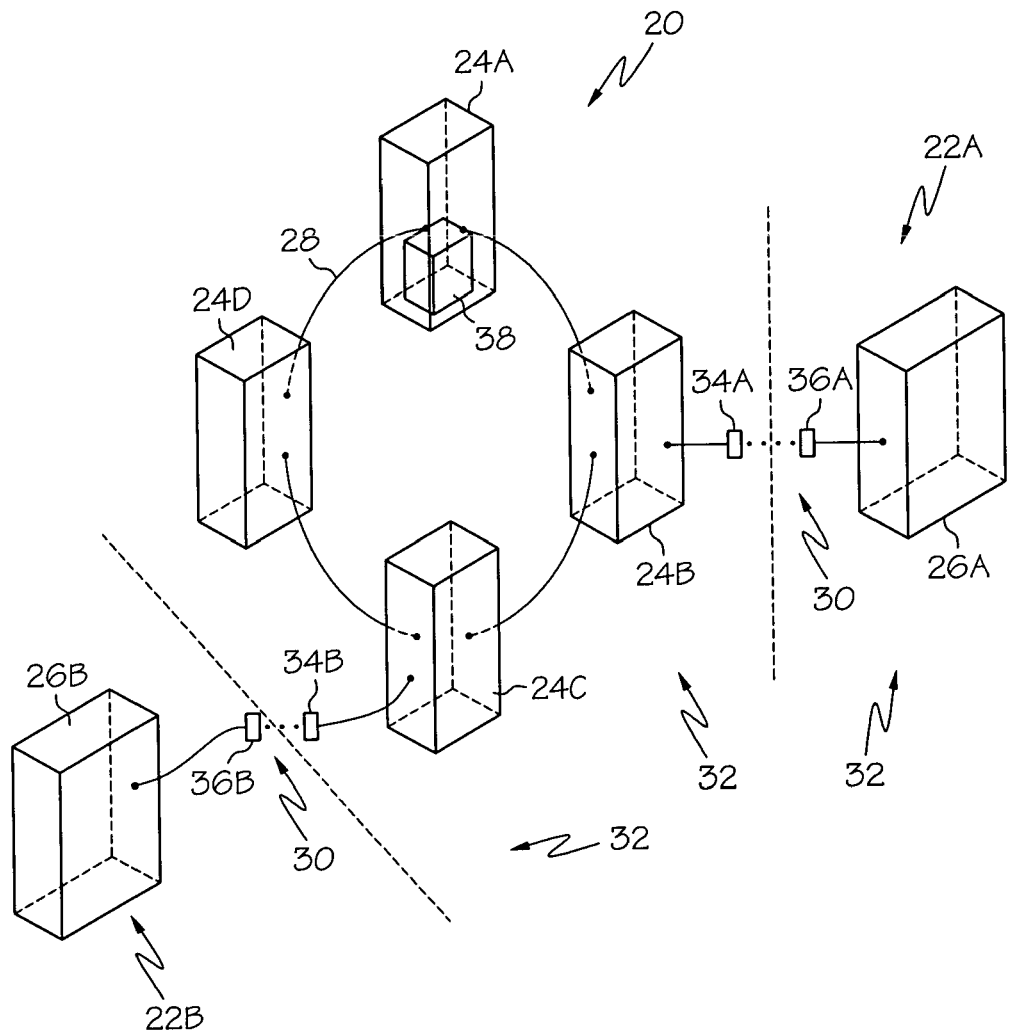
FIG. 1 is a block diagram of a first example of a distributed computer network illustrating a system event initiated from a remote system, and a system event initiating activity on a remote system, in accordance with the present invention.

FIG. 1 is a block diagram of a first example of a distributed computer network illustrating a system event initiated from a remote system, and a system event initiating activity on a remote system, in accordance with the present invention. With reference to FIG. 1, a distributed network 32 includes, for example, a local network 20 comprising a plurality, for example four, local servers 24A, 24B, 24C, 24D. The local servers 24A, 24B, 24C, 24D each communicate with each other via communication link 28, for example local area network 28, or similar communication protocol. The focal network 20 further includes at least one distributed interface 34A, 34B to allow for communication between the local network 20 and remote clients 26A, 26B, for example via the Internet 30.

Remote users 22A, 22B access the local network 20 via remote clients 26A, 26B, which may, for example, optionally be part of a remote network that is external to the local network 20. Remote clients gain access to the local network via interfaces 36A, 36B, which, for example, provide remote client access to the Internet.

In one embodiment, an event management tool 38 in accordance with the present invention is operable on the local network 20, for example at local server 24A to record, manage, and respond to, system events that occur on the local network. In one example, a system event is monitored by the operating system of one of the local servers 24A-D, for example server 24D, and is logged in a suitable event log, along with multiple other system events, according to operating system convention of the host of the event.

The event management tool software or process 38, active on server 24A, periodically polls, or otherwise monitors, the system event logs of other servers 24B-D in the network, as well as the system event logs of its own host server 24A, and collects information stored in the system event logs. In one embodiment, the system events, as recorded in the log files, are converted to a convention that can be interpreted and readily managed, by the event management tool 38. Such conversion, also referred to herein as "normalization", allows for system events generated by different operating systems or different versions of operating systems, located on the local network 20, to be interpreted by a common event management tool 38. As an alternative to polling log files, the event management tool may optionally process system events in real time, as they are generated, or may optionally obtain information related to system events from applications running on the operating system, for example Lotus Notes™, Oracle™ database applications, etc., for example in the form of application logs or network appliance (firewalls, routers, etc.) logs In one example, the normalized system events are characterized according to five attributes, namely: "who" (the client initiating the event); "what" (the type of event that was initiated); "when" (the time at which the event occurred); "where" (the system or device on which the event occurred); and "on what" (the file, device, or setting that was accessed by the event). As described above, these normalized system events can be cataloged and managed by the event management tool 38 to provide for a comprehensive security overview of activity in the local network 20. A forensic statement of the activity is generated, and the management tool 38 can review the events, identify breaches, and respond in any of a number of ways including, for example, immediate alerts to security personnel, offline generation of security reports, and the like.

While such an event management tool is capable of resolving, and acting on, system events generated within the local network, such a system is unable to resolve attributes of system events that are initiated by clients, or act upon clients, that are remote to the local network, for example remote users 22A, 22B. While the source or destination of a system event may be identified according to the remote interface port 34A, 34B, no information about the system event external to the port, 34A, 34B is available to the event management tool 38.

The system and method of the present invention overcome this limitation by resolving additional attributes related to the system event during normalization; namely "where from" (the identity of the client initiating the event) and "where to" (the identity of the client acted upon by the event). In this manner, the event management tool 38 has an additional layer of information with which to interpret a system event. This includes the capability of resolving the source ("where from") and client destination ("where to") of system events across distributed networks.

The identity of the client can be derived from information that is unique to a given client. In a preferred embodiment, the identity is derived from the client IP address. In the example of the Internet, each client is assigned a unique IP address that is either fixed, or dynamic, depending on the type and level of Internet access. A fixed IP address identifier may be designated to a client that permanently resides on the Internet. A dynamic IP address may be designated to a client that periodically resides on the Internet, for example through an Internet provider. In the dynamic case, the Internet provider is required to retain a log of the temporarily assigned IP addresses appointed to subscribers.

When an event is logged by a modern operating system, the IP addresses of the source and destination clients are recorded in the event log. The normalization process of the present invention therefore generates a normalized event that includes the "where from" and "where to" attributes, and therefore can base management decisions on these additional parameters.

In the example provided in FIG. 1, assuming remote client 26A initiates an event on server 24B, the security log, as recorded by the server 24B operating system will include information related to the identity of source client of the event, for example the IP address of the remote client 26A. Through normalization of the "where from" attribute, the identity of the remote client 26A is transferred to the event management tool 38, and can be utilized by the tool in arriving at a system security decision.

In addition, the "where to" attribute can be utilized to track the identity of a remote or local client that is acted upon. For example, if a client accessing server 24C initiates an event that accesses, or otherwise acts upon, remote client 26B, the identity, for example the IP address, of client 26B is recorded in the event log by the operating system of server 24C. Through normalization of the "where to" attribute, the identity of the remote client 26B is transferred to the event management tool 38, and can be utilized by the tool in arriving at a system security decision.

Figure 2:
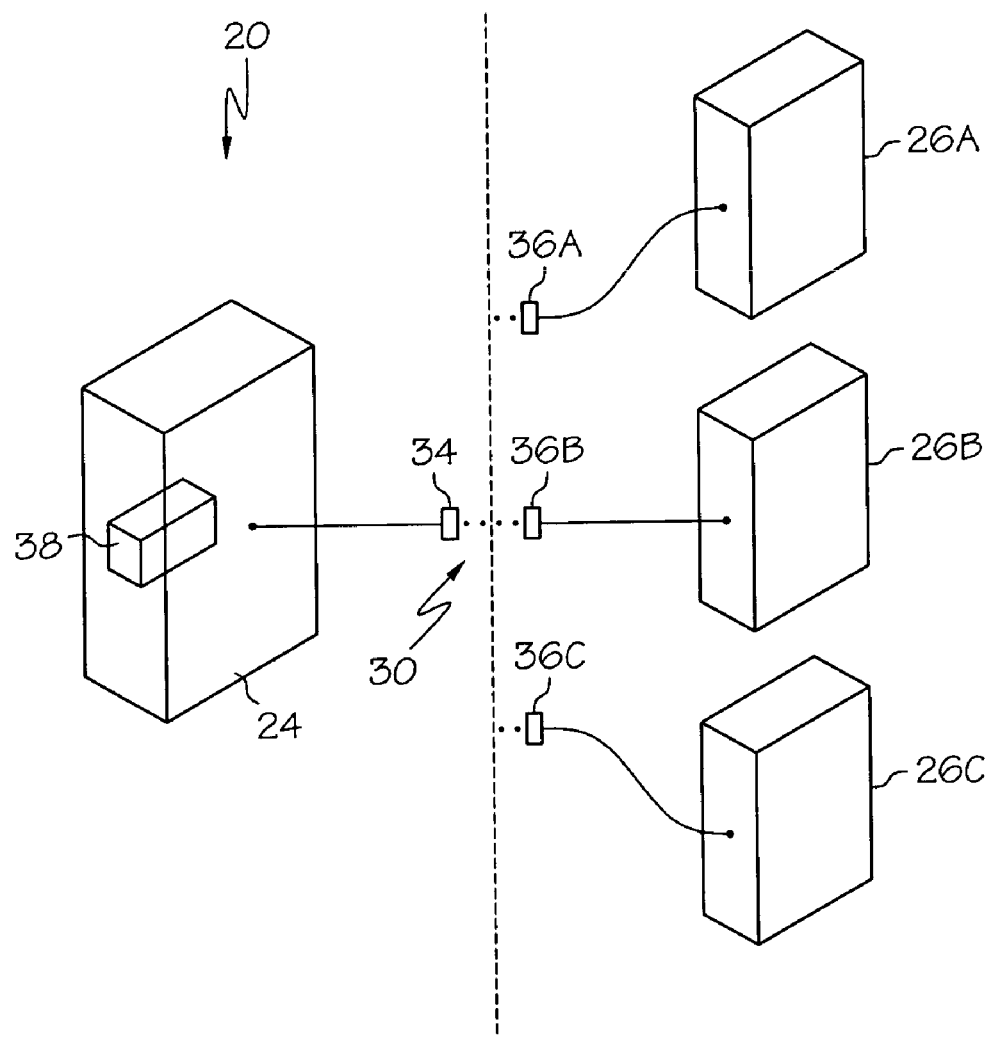
FIG. 2 is a block diagram of a second example of a distributed computer network illustrating a system event initiated from a remote system, and a system event initiating activity on a remote system, in accordance with the present invention.

FIG. 2 is a block diagram of a second example of a distributed computer network illustrating system events initiated from remote systems, and system events initiating activity on a remote system, in accordance with the present invention. In this example, a local server 24, is connected to the Internet 30 via local interface 34. Remote clients 26A, 26B, 26C, each having a unique IP address, whether fixed or dynamic, access the Internet via remote interfaces 36A, 36B, 36C. An event management tool 38, configured in accordance with the systems and methods of the present invention operates on the local server 24 to interpret and respond to system events that involve the server 24. In this example, assuming the event management tool is configured to normalize logged events according to the attributes "where from" and "where to", resolution of system events initiated by, or acting upon, remote clients 26A, 26B, and 26C, as well as server 24, is possible.

Figure 3:
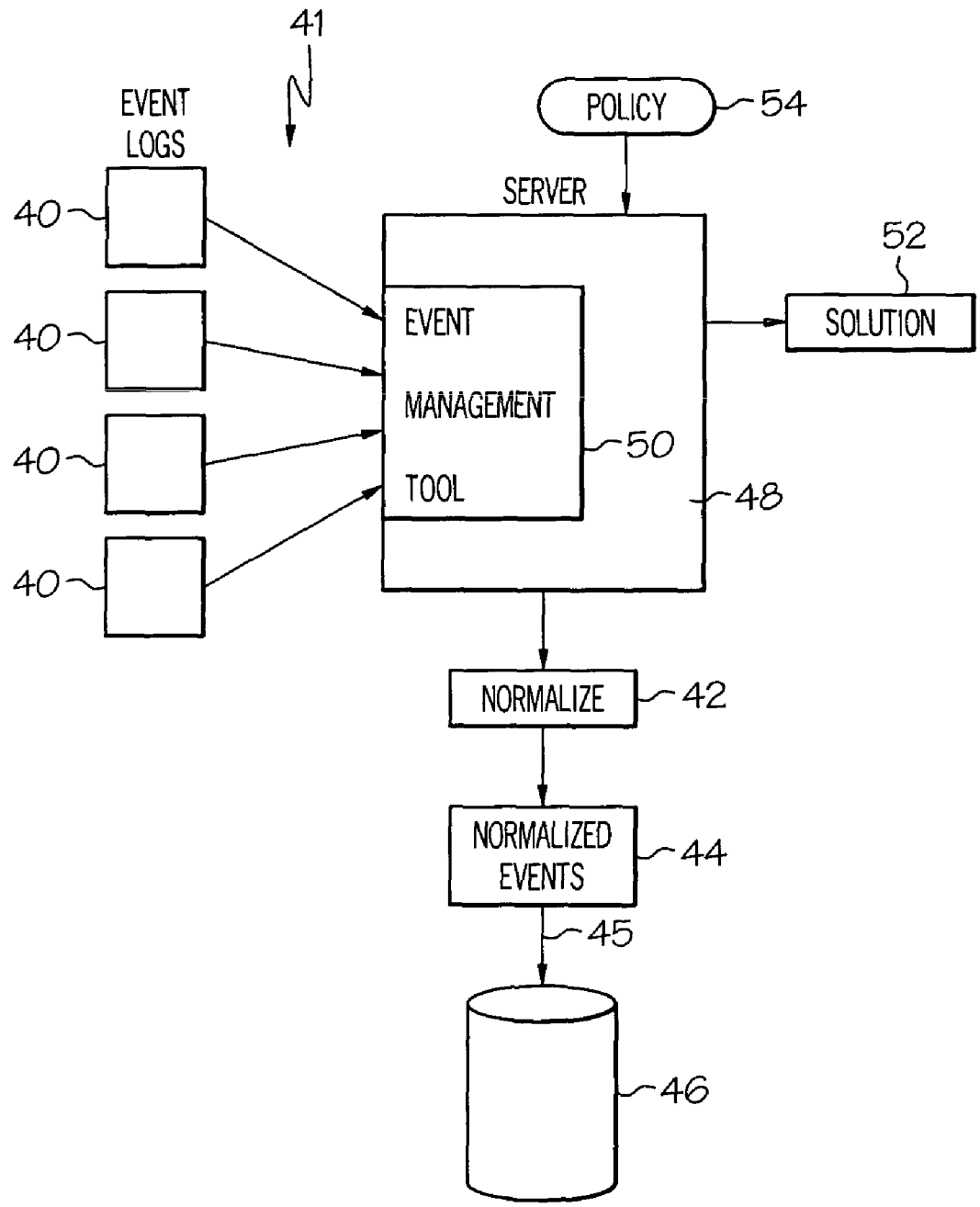
FIG. 3 is a block diagram of the normalization and storage of events by a server on which the event management tool of the present invention is operating, in accordance with the present invention.

FIG. 3 is a block diagram of the normalization and retrieval of events by a server on which the event management tool of the present invention is operating, in accordance with the present invention. Event logs 40 are generated by an operating system on a given server, or by multiple similar operating systems on multiple servers, or by multiple different operating systems on multiple servers: The event logs are retrieved 41 by the event management tool 50 operating on server 48, which normalizes 42 the event logs 40 in the manner described above to generate normalized events 44. In an alternative embodiment, an event transport process such as SYSLOG or SNMP may be used to immediately transfer the event log to the event management tool on an event-by-event basis. Further, in an alternative embodiment, normalization can occur at each individual server generating the event log 40.

The event logs 40 are centrally archived on the server 48, and periodically normalized. The normalized event logs are loaded 45 into a database 46, and accessed as needed by the event management tool 50. The event management tool 50 accesses the normalized event logs 46 during its operation, and from time to time, reaches a management decision, for example in the form of solution 52.

Solution 52, in one example, is based upon a comparison of one, or multiple, normalized system events with a security policy 54. The normalized events are compared to a predefined security policy for the system. The security policy defines the bounds of which system events are acceptable, and which system events are unacceptable.

In one embodiment, the system events are each assigned a severity level, based on exceptions or breaches identified during the comparison. The event management tool then reacts to the event or events based on the severity level of the breach. The tool can react in any of number of ways, depending on the application. For example, in the event of a severe breach, the event management tool may react by immediately generating and transmitting an alert alarm or instant message to an appropriate security officer. Alternatively, the event management tool may record the event in a report and periodically transmit the report to an officer.

Figure 4:
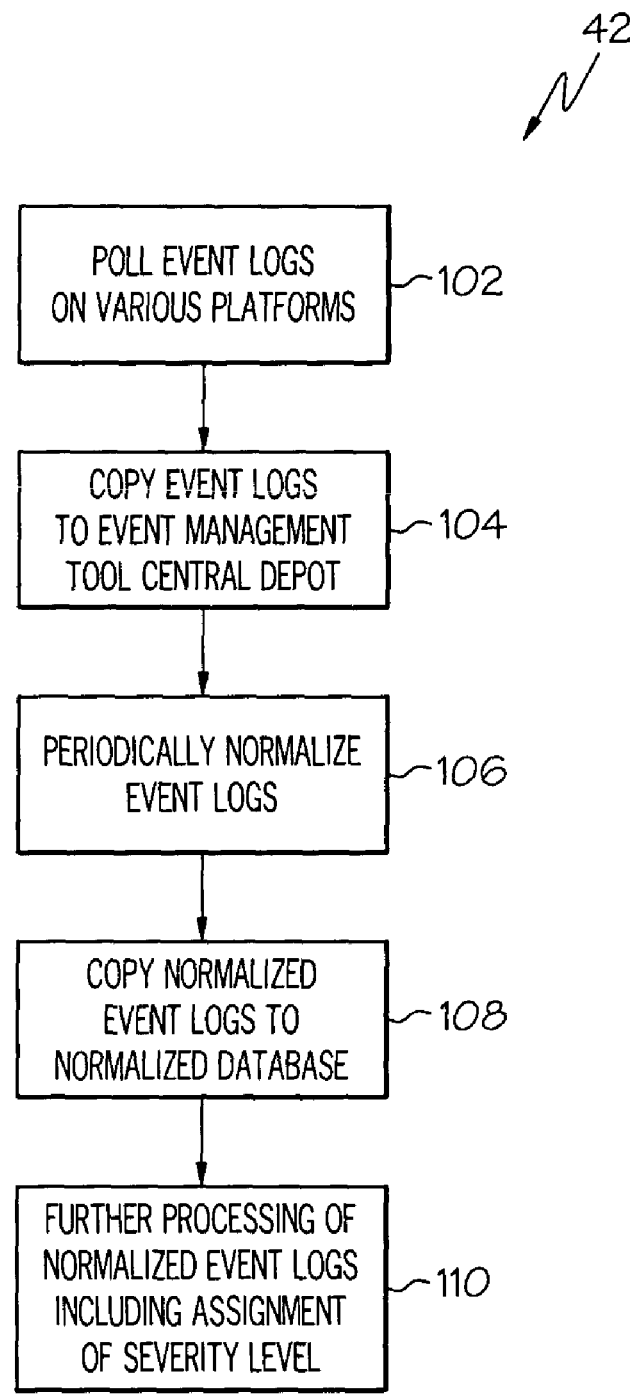
FIG. 4 is a flow diagram of a normalization procedure in accordance with the present invention.

FIG. 4 is a flow diagram of a normalization procedure 42 in accordance with the present invention. With additional reference to FIG. 3, the various platforms on the system under the control of the event management tool are periodically polled 41 at step 102 for event logs 40. As described above, these event logs are generated by the operating system of the host platform, and may be formatted in any of a number of ways, depending on the operating system. The event logs 40 are copied 41 to a central depot of the event management tool 50 at step 104, where they are stored for processing. The event management tool 50 periodically normalizes 42 the stored event logs, including the normalization of the "where from" (identity of the client initiating the event) and "where to" (identity of the client acted upon by the event) attributes at step 106. Examples of such normalized event logs 44 are provided below with reference to FIGS. 5A, 5B and 6A, 6B. The normalized event logs 44 are copied 45 to a database 46 at step 108, where they are made available to the event management tool 50 for further processing at step 110, including the assignment of a severity level to the normalized event log, as described in further detail below.

Figure 5A:
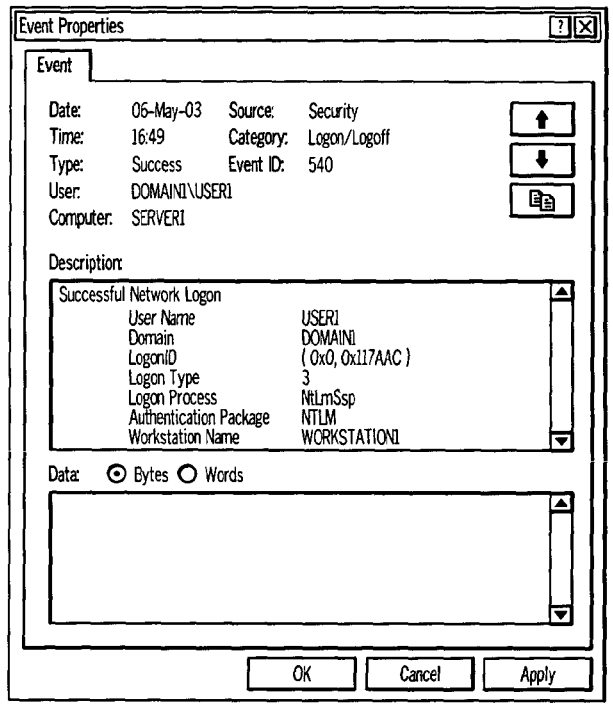
FIGS. 5A and 5B provide an example of an original event log and a normalized event log for a system event of a Windows/NT 2000™ fileserver, in accordance with the present invention.
Figure 5B:
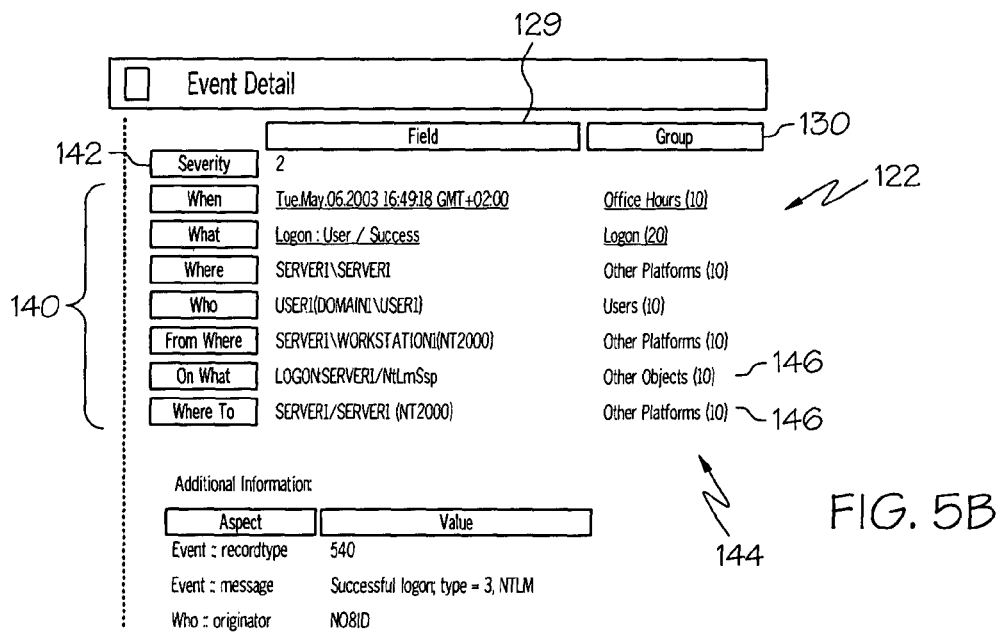

FIGS. 5A and 5B provide an example of an original event log and a normalized event log for a system event of a Windows/NT 2000™ fileserver, in accordance with the present invention. The event log 120 of FIG. 5A is the result of a user USER1 logging onto a Windows/NT 2000™ fileserver from his own workstation WORKSTATION1. The event occurs on a machine SERVER1, i.e. the "computer field" in the original event 120. The event was initiated from a machine WORKSTATION1, i.e. the "workstation name" in the original event 120.

With reference to FIG. 5B, as a result of normalization, the normalized event log 122 is generated. The normalized event log includes the seven attributes described above; namely, "who" (the user initiating the event); "what" (the type of event that was initiated); "when" (the time at which the event occurred); "where" (the system or device on which the event occurred); and "on what" (the file, device, or setting that was accessed by the event); "where from" (identity of the client initiating the event) and "where to" (identity of the client acted upon by the event). In this example, it can be seen that the "computer" field SERVER1 of the original event log 120 is normalized in the resulting normalized event log 122 such that it is applied to both "where" and "where to" attributes, because, in this example, the device on which the event occurred and the identity of the client acted on by the event were both the same, namely "SERVER1". Since the event was initiated from the user's machine, the workstation name, namely WORKSTATION1 of the original event log 120 is normalized to the "from where" attribute in the normalized event log 122.

The name of the workstation WORKSTATION1 normalized to the "from where" field may alternatively comprise any of a number of client identifiers, such as the IP address of the workstation, the workstation name, an originating email address, a fully-qualified host name, and the like. Similarly, the name of the computer SERVER1 hosting the event may comprise any of a number of similar client identifiers, such as the IP address of the workstation being acted upon, the workstation name, a recipient email address, a fully-qualified host name, and the like.

Figures 6A, 6B:
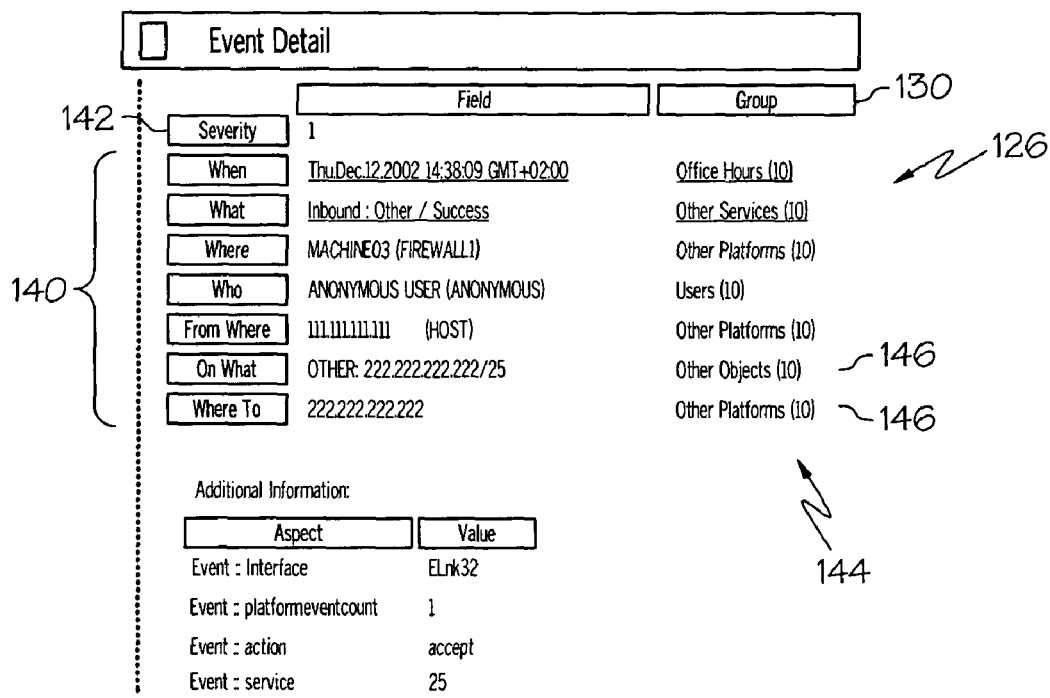
FIGS. 6A and 6B provide an example of an original event log and a normalized event log for a system event of a Checkpoint Firewall-1 Firewall™ server, in accordance with the present invention.

FIGS. 6A and 6B provide an example of an original event log and a normalized event log for a system event of a Checkpoint Firewall-1 Firewall™ server, in accordance with the present invention. The original event log 124 of FIG. 6A is the result of a connection being made by an anonymous user from outside a firewall to a network protected by the firewall. The normalized event log 126 of FIG. 6B includes the same seven attributes 140 as those of the example of FIG. 5B.

With reference to FIG. 6A, in this example, it can be seen that the event occurs on a machine "MACHINE03", the name of the firewall machine, and this field is normalized in the normalized event log 126 to the "where" field. The connection was initiated from a machine having IP number 111.111.111.111, as shown in the "src" field of the original event log 124. As shown in FIG. 6B, this information is normalized in the resulting normalized event log 126 to the "from where" field. The connection was made through the firewall, to a machine with IP number 222.222.222.222, as shown in the "dst" field of the original event log 126. This information is normalized to the "where to" attribute in the resulting normalized event log 126.

With reference to FIGS. 5B and 6B, the normalized event logs 122 include two columns of information, namely the data that is assigned to the various attributes, i.e. the "field" column 129, and a group to which each data element of each attribute belongs, i.e. the "group" column 130. In addition, the normalized event log further includes a "severity level" 142 that is assigned to the event by the event management tool. The definition of groups and the assignment of the severity level to the event will now be described in further detail.

As a first step in configuring a security policy for the system, groups are defined in the security database. For each dimension, or attribute, in the security database, a number of groups are defined, which categorize the types of data that are to be associated with a given attribute. For example, the "when" attribute may include groups that define time elements, such as "office hours", "weekends", or "weekdays". The "who" attribute may include groups related to the various forms of users, such as "network administrators" or "general users". The "what" attribute may include groups related to the types of actions that can occur, such as "file write actions", "file read actions", "administrative actions", or "email transfer". The "on what" attribute may include, for example, groups related to the types of files being operated on. The "where", "where from", and "where to" attributes may include groups related to the types of clients at which the event can occur, the types of clients initiating the event, or the types of clients being acted upon by the event, for example "web servers", "test servers", "mail servers", "file servers", "workstations", or "database servers". In addition, each group within an attribute is assigned a significance factor, for example in the form of a number 10, 20, 30 . . . , that is used as a weighting by the event management tool in later assigning a severity level to an event, as will be described in detail below.

Upon the definition of groups of the various attributes, a set of policy rules can be generated, which define permitted actions, or normal operations, within a security system. For example, a policy rule can be defined to mandate that only "system administrators" are permitted to modify files after "office hours". A set of policy rules can be cataloged using the event management tool 50 to define normal system operations. Any event that does not meet the criteria of any of the set of policy rules is considered to be an "exception" to the policy. Certain policies may focus on permitted activity related to a certain attribute or attributes. In particular, policies relating to the "where from" and "where to" attributes can mandate, for example, that certain, very sensitive actions are permitted only from certain terminals that are physically well-protected. Such actions may include, for example, modifications to the security environment, or to permit access to client files remotely from only certain users within a defined user group from only certain IP addresses within a defined group of IP addresses, or to permit access to only certain interne sites by certain users. When an event is compared to the set of policy rules, if no match is determined, this means that the event does not comply with policy, and as such constitutes a policy exception. For this reason, this comparison is referred to as "negative" matching.

In addition, a set of policies may be compiled to define abnormal actions, i.e. those actions that are not permitted by a security system. Such policies are referred to herein as "special attention rules", since an event that qualifies as a violation of such a policy may require special attention by security personnel. In various embodiments, such special attention rules may include rules that monitor events that conform to one or more policies, but need to be specially monitored by an independent rule. When an event is compared to the set of special attention rules, if a match is determined, this means that the event has triggered a special attention situation. For this reason, this comparison is referred to as "positive" matching.

As shown above in FIGS. 5B and 6B, each normalized system event 122, 126 is assigned a severity level 142. The severity level 142 is indicative of the general significance of a given event, and indicative of the extent to which the event conforms to security policies and rules. The severity level provides an additional gauge by which a decision can be made as to the manner in which an event is to be processed or as to the relative importance of the event.

Figure 11:
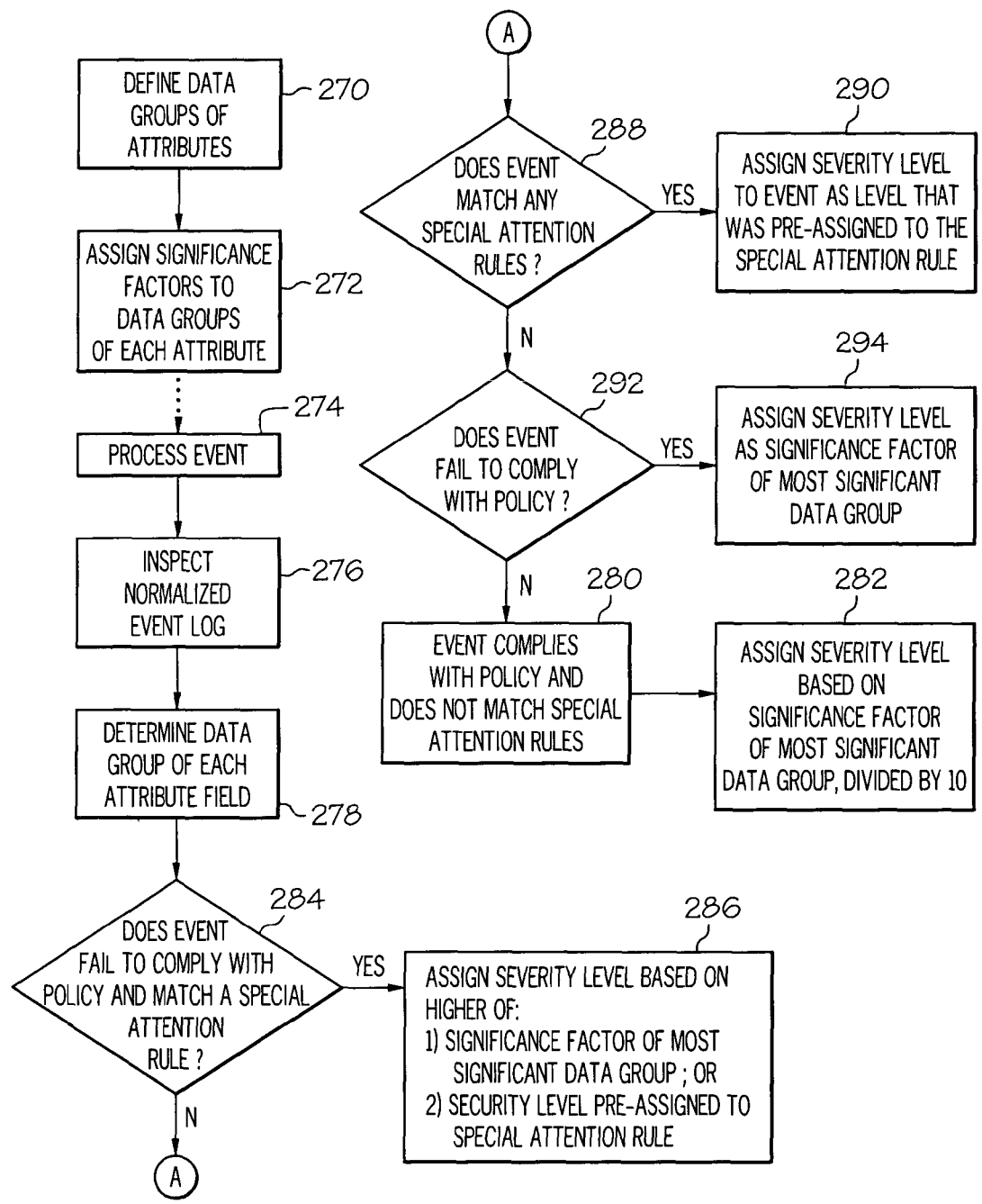
FIG. 11 is a flow diagram of a procedure for assigning a severity level to an event, in accordance with the present invention.

FIG. 11 is a flow diagram of a process for assigning a severity level to an event, in accordance with the present invention. As described above, data groups of the various attributes are pre-defined 270, and significance factors are pre-assigned to the defined data groups 272. Upon the processing of an event 274, the normalized event log data is inspected 276, and the data groups of each attribute field are determined 278. Next, a severity level is assigned to the event according to whether the event complies with systems policies, and according to whether the criteria of any special attention rules are met. The steps that correspond to this inquiry 284, 288, 292, and 280, and the resulting assignment of a severity level 286, 290, 294, and 282 are described in further detail below, with reference to the following set of examples.

In the present example, each special attention rule may be assigned a specific severity level, depending on the significance of the rule. For example, in the case where a normalized system event meets the criteria of a special attention rule (see step 288 of FIG. 11), the normalized event is directly assigned the severity level of the rule (see step 290 of FIG. 11).

Figure 7:
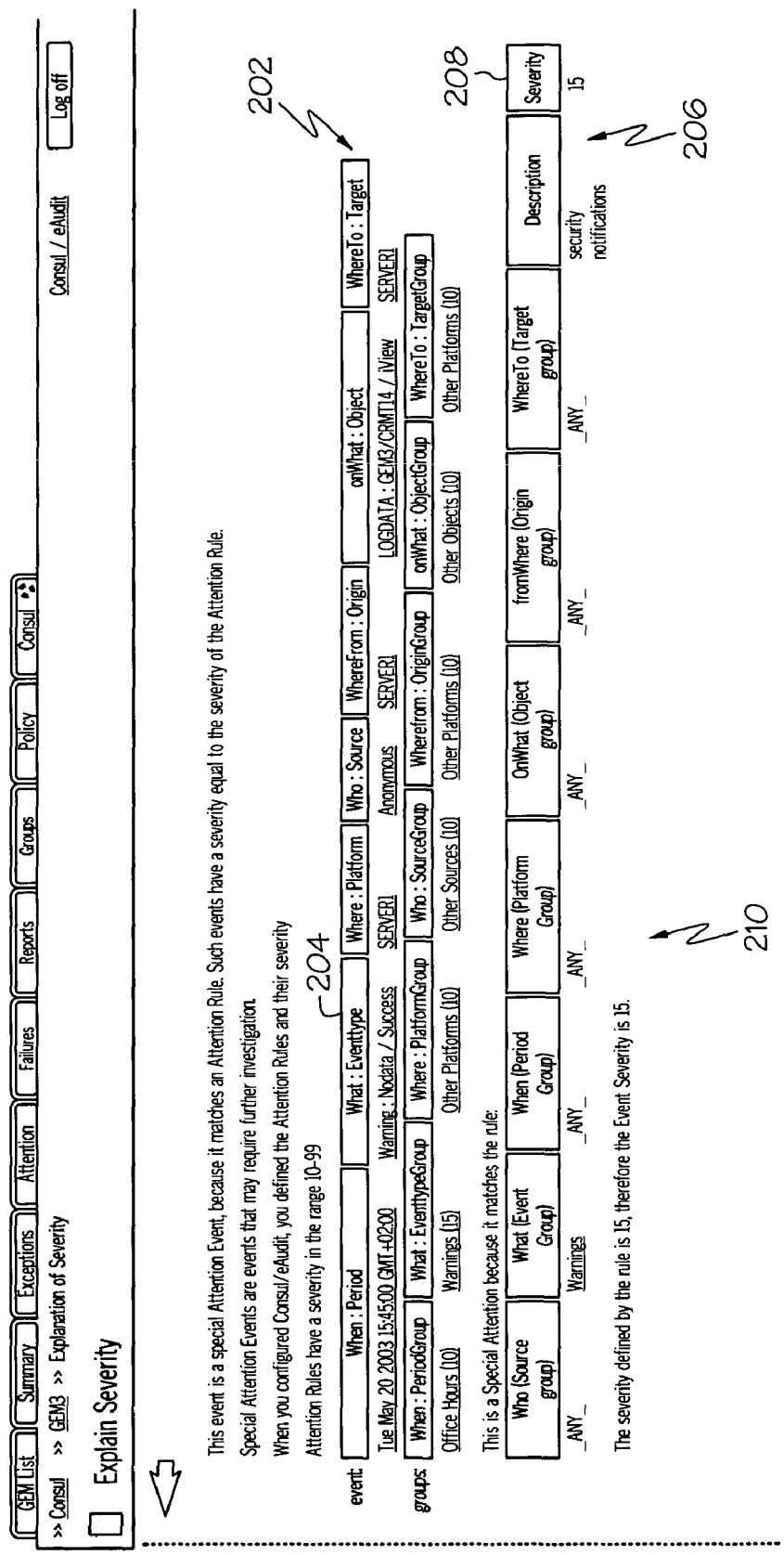
FIG. 7 is a screen shot image of a summary report that is generated in relation to a normalized system event that conforms to a special attention rule, in accordance with the present invention.

An example of this is shown in FIG. 7, which is screen shot image of a summary report that is generated in relation to a normalized system event that conforms to a special attention rule. In this example, the event management tool has determined that the normalized event 202 includes a "what" attribute in the form of a warning. In this case, a special attention rule 206 is matched by the normalized event, the rule being related to "security notifications" and is triggered in the case of a "warnings" group being assigned to the "what" attribute. In this rule 206, the assigned severity level 208 is 15. Since the normalized event log matches the rule, the event is assigned a severity level 210 of 15.

In another example, the severity level of an event is assigned based on whether the event constitutes an exception to the system policies (see step 292 of FIG. 11). For example, in the case where an event has at least one attribute that does not fall within system policies, that event is categorized as an exception to the polices. As a result, the event is issued a severity level based on a significance factor that is assigned to each of the applicable groups of each attribute (see step 294 of FIG. 11).

Figure 8:
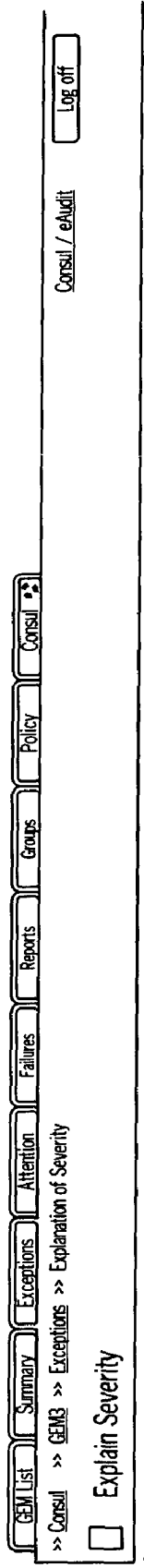
FIG. 8 is a screen shot image of a summary report that is generated in relation to a normalized system event that constitutes an exception to the system policies, in accordance with the present invention.

An example of this is shown in FIG. 8, which is a screen shot image of a summary report that is generated in relation to a normalized system event that constitutes an exception to the system policies. In this example, the event management tool has determined that the normalized event 212 includes a "what" attribute in the form of a module update 214. In this case, none of the special attention rules are matched by the normalized event 212. In addition, it is also determined by the event management tool that the event 212 does not fall within the system policies, so it is deemed an "exception" to the policy. As a result, the significance factors 216 of the various groups 218 of the attributes are inspected to determine which is the most significant. In this case, it is determined that group "System Updates" of the "what" attribute has a significance factor of 50, which is higher than all other group significance factors, and thus is most significant. Therefore, the event is assigned a severity level 220 of 50.

In another example, the severity level of an event is assigned based on a combination of whether the event meets the criteria of a special attention rule and whether the event constitutes an exception to the system policies (see step 284 of FIG. 11). For example, in the case where an event has at least one attribute that does not fall within system policies, that event is categorized as an exception to the polices, yet, the event may still fall within the criteria of a special attention rule. As a result, the event is issued a severity level that is equal to the greater of a first severity level that is based on a significance factor that is assigned to each of the applicable groups of each attribute and a second severity level that is assigned directly to the subject special attention rule (see step 286 of FIG. 11).

Figure 9:
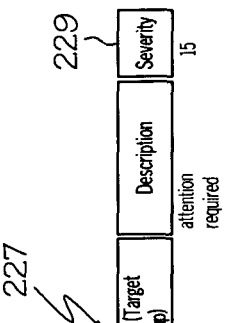
FIG. 9 is a screen shot image of a summary report that is generated in relation to a normalized system event that constitutes both an exception to the system policies and one that conforms to a special attention rule, in accordance with the present invention.

An example of this is shown in FIG. 9, which is a screen shot image of a summary report that is generated in relation to a normalized system event that constitutes both an exception to the system policies and one that conforms to a special attention rule. In this example, the event management tool has determined that the normalized event 222 includes a "what" attribute in the form of a database load failure 224. In addition, it is also determined by the event management tool that the event 224 does not fall within the system policies, so it is deemed an "exception" to the policy. As a result, the significance factors 226 of the various groups 228 of the attributes are inspected to determine which is the most significant. In this case, it is determined that group "Alerts—Medium" of the "what" attribute has a significance factor of 60, which is higher than all other group significance factors. At the same time, in this case, a rule 227 is matched by the normalized event 222, the rule being related to the description "attention required" and is triggered in the case of the "Alerts—Medium" group being assigned to the "what" attribute. In this rule 227, the assigned severity level 229 is 50. In this case, the assigned severity level of the event is determined as the higher of the policy exception severity, namely 60, and the special attention rule severity, namely 50. Therefore, the event is assigned a severity level 230 of 60.

In another example, the severity level of an event is assigned in the case where the event conforms to the system policies. For example, in the case where the attributes of an event include groups that all conform to system policies, that event is thus determined to comply with the polices (see step 280 of FIG. 11). As a result, the event is issued a severity level based on a significance factor that is assigned to each of the applicable groups of each attribute, and in one example, the significance factor is divided by 10 under these circumstances (see step 282 of FIG. 11).

Figure 10:
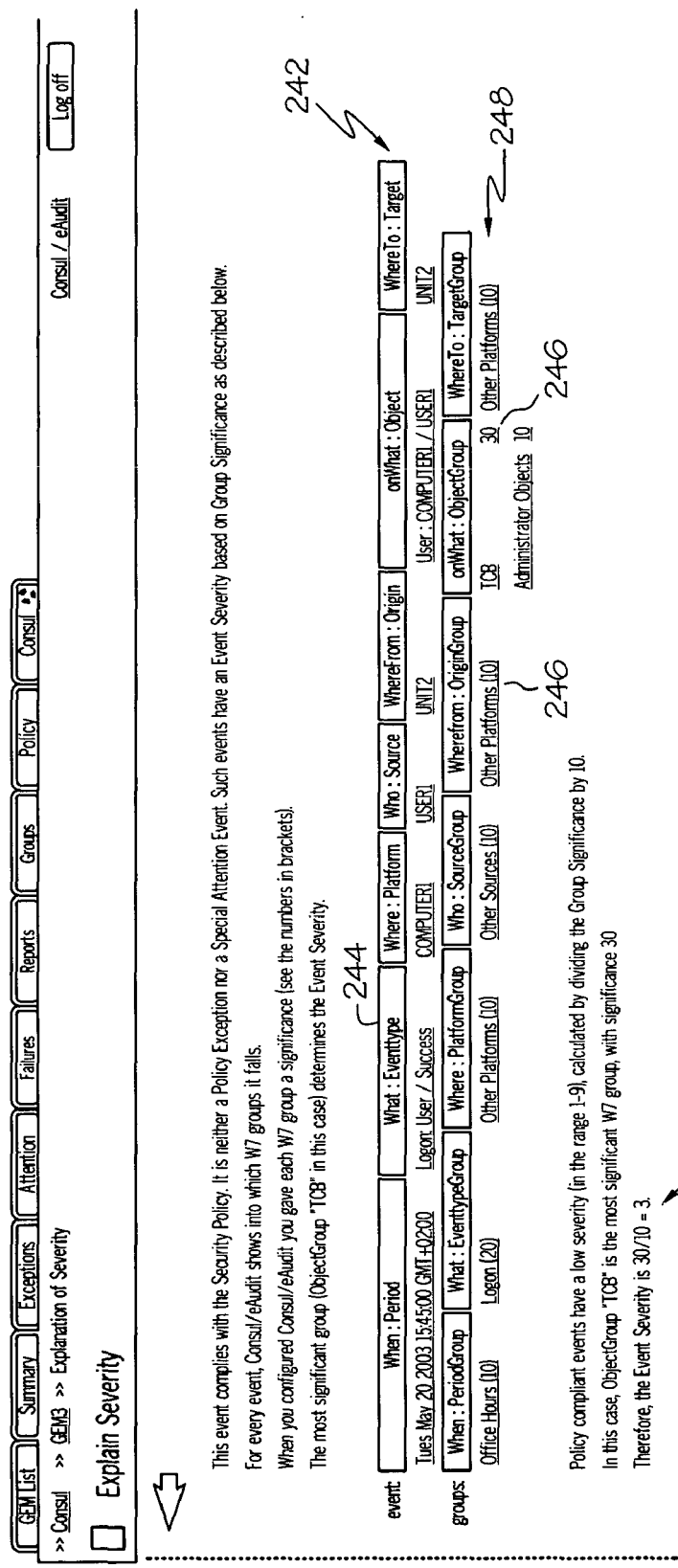
FIG. 10 is a screen shot image of a summary report that is generated in relation to a normalized system event that complies with the system policies, in accordance with the present invention.

An example of this is shown in FIG. 10, which is screen shot image of a summary report that is generated in relation to a normalized event log that complies with the system policies. In this example, the event management tool has determined that the normalized event 242 includes a "on what" attribute in the form of an object that falls within the "TCB" group. Since the event management tool has determined that the event 242 complies with the system policies, the significance factors 246 of the various groups 248 of the attributes are inspected to determine which is the most significant. In this case, it is determined that group "TCB" of the "on what" attribute has a significance factor of 30. Therefore, the event is assigned a severity level 250 that is equal to the highest significance factor, namely 30, divided by 10, which equals 3.

Upon the assignment of a severity level to an event, the severity level can be used as a sorting parameter for the solution 52 (see FIG. 3), which, as described above, may take the form of reports, alerts, warnings, and the like.

In this manner, the present invention provides a system and method by which system events that are generated across distributed systems can be tracked by the event management tool such that the initiating client of an event and/or the recipient client of an event can be resolved in both local and distributed networks. In addition, such information is normalized into a normalized event log such that events generated at a variety of different client operating systems, applications, or network appliances, can be interpreted by the same event management tool. In addition, the normalized events are assigned a severity level that can be used as a gauge of the relative severity of each event with regard to system security.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for managing system events in a network, comprising:
   receiving, by a computer, a system event initiated by an initiating client associated with a user, wherein the system event comprises a plurality of data elements associated with respective ones of a plurality of system event attributes;
   evaluating the plurality of data elements of the system event against a security policy and determining that the system event fails to conform to the security policy for the user, wherein the security policy defines permitted actions for different users in accordance with the plurality of system event attributes;
   determining a greatest of a plurality of significance factors assigned to a plurality of data groups that are associated with the plurality of data elements of the system event;
   determining whether the system event matches a special attention rule in accordance with the plurality of data elements, wherein the special attention rule defines a prohibited action;
   if the system event does not match the special attention rule and the system event fails the security policy, assigning to the system event the greatest of the plurality of significance factors as a severity level; and
   if the system event matches the special attentions rule and the system event fails the security policy,
      comparing the greatest of the plurality of significance factors against a pre-assigned severity level that was pre-assigned to the special attention rule; and
      assigning to the system event a greater of the greatest of the plurality of significance factors and the pre-assigned severity level as a severity level.

2. The method of claim 1 further comprising normalizing the system event according to the plurality of system event attributes to generate a normalized system event.

3. The method of claim 2, wherein said normalizing the system event according to the plurality of system event attributes comprises associating a first of the plurality of data elements to a data field corresponding to a first of the plurality of system event attributes of the normalized system event.

4. The method of claim 3, wherein plurality of data elements comprises at least one of the identity of the initiating client and an identity of a recipient client that is acted upon by the system event.

5. The method of claim 3 wherein the identity comprises one of:

an Internet Protocol address, a workstation name, an email address, and a fully-qualified host name.

6. The method of claim 1 further comprising:
receiving a second system event initiated by a second initiating client associated with a second user, wherein the system event comprises a second plurality of data elements associated with respective ones of the plurality of system event attributes;
comparing the second plurality of data elements of the system event to the security policy and determining that the second system event conforms to the security policy for the second user;
determining a greatest of a second plurality of significance factors assigned to a second plurality of data groups that are associated with the second plurality of data elements of the second system event;
computing a conforming severity level as the greatest of the second plurality of significance factors divided by a coefficient common to the second plurality of significance factors; and
assigning to the second system event the conforming severity level as a severity level.

7. The method of claim 1 further comprising generating a solution to the event based on the severity level.

8. The method of claim 7 wherein the solution comprises generation of an immediate alert, an email message, an instant message, or a report.

9. The method of claim 1 wherein the network is a distributed network.

10. A system for managing system events in a network, comprising:
a processor;
a storage media having a security policy stored therein, the security policy defining permitted actions for different users in accordance with a plurality of system event attributes; and
a storage media encoded with program instructions executable by the processor, the program instructions to:
receive a system event initiated by an initiating client associated with a user, the system event configured to act on a recipient client, wherein the system event comprises a plurality of data elements associated with respective ones of a plurality of system event attributes;
evaluate the plurality of data elements of the system event against the security policy to determine whether the system event conforms to the security policy for the user;
determine a greatest of a plurality of significance factors assigned to a plurality of data groups that are associated with the plurality of data elements of the system event;
determine whether the system event matches a special attention rule in accordance with the plurality of data elements, wherein the special attention rule defines a prohibited action;
if the system event does not match the special attention rule and the system event fails the security policy, assign to the system event the greatest of the plurality of significance factors as a severity level; and
if the system event matches the special attentions rule and fails the security policy,
compare the greatest of the plurality of significance factors against a pre-assigned severity level that was pre-assigned to the special attention rule; and
assign to the system event a greater of the greatest of the plurality of significance factors and the pre-assigned severity level as a severity level for the system event.

11. The system of claim 10, wherein the storage media also has program instructions to normalize the system event according to the plurality of system event attributes to generate a normalized system event.

12. The system of claim 10, wherein the program instructions to normalize the system event according to the plurality of system event attributes comprises program instructions to associate a first of the plurality of data elements to a data field corresponding to a first of the plurality of system event attributes of the normalized system event.

13. The system of claim 12 wherein the plurality of data elements comprises at least one of identity of the initiating client and an identity of a recipient client that is acted upon by the system event.

14. The system of claim 12 wherein the identity comprises one of:
a workstation name, an Internet Protocol address, an email address, and a fully-qualified host name.

15. The system of claim 10, wherein the plurality of data elements comprise at least one of:
the identity of a user initiating the system event; the type of system event that was initiated; the time at which the system event occurred; the system or device on which the system event occurred; and the file, device, or setting that was accessed by the system event.

16. The system of claim 10, wherein the storage media further has program instruction to:
compute a conforming severity level as the greatest of the plurality of significance factors divided by a coefficient common to the plurality of significance factors if the system event conforms to the security policy; and
assign the conforming severity level as a severity level to the system event that conforms to the security policy.

17. The system of claim 10 wherein a solution to the system event is generated based on the severity level.

18. The system of claim 17 wherein the solution comprises generation of an immediate alert, an email message, an instant message, or a report.

19. The system of claim 10 wherein the network is a distributed network.

20. A non-transitory computer-readable storage medium comprising program instructions executable to:
receive a system event initiated by an initiating client associated with a user, wherein the system event comprises a plurality of data elements associated with respective ones of a plurality of system event attributes;
evaluate the plurality of data elements of the system event against the security policy to determine whether the system event conforms to the security policy for the user; wherein the security policy defines permitted actions for different users in accordance with the plurality of system event attributes;
determine a greatest of a plurality of significance factors assigned to a plurality of data groups that are associated with the plurality of data elements of the system event;
determine whether the system event matches a special attention rule in accordance with the plurality of data elements, wherein the special attention rule defines a prohibited action;
if the system event does not match the special attention rule and the system event fails the security policy, assign to the system event the greatest of the plurality of significance factors as a severity level; and if the system event matches the special attentions rule and fails the security policy,
    compare the greatest of the plurality of significance factors against a pre-assigned severity level that was pre-assigned to the special attention rule; and
    assign to the system event a greater of the greatest of the plurality of significance factors and the pre-assigned severity level as a severity level.

21. The non-transitory computer-readable storage medium of claim 20 further comprising program instructions to normalize the system event in accordance with the plurality of system event attributes for evaluation.

22. The non-transitory computer-readable storage medium of claim 21, wherein the program instructions to normalize the system event in accordance with the plurality of system event attributes comprises program instructions to assign the plurality of data elements from the system event to respective ones of attribute fields that corresponds to the plurality of system event attributes.

23. The non-transitory computer-readable storage medium of claim 22, wherein the plurality of system event attributes comprise at least two of a time attribute, an event type attribute, a platform attribute, a user source attribute, a machine origin attribute, a user recipient attribute, and a machine target attribute.

24. The non-transitory computer-readable storage medium of claim 21, wherein the program instructions to normalize the system event further comprising program instructions to:
    for each of the plurality of data elements,
        determine a set of data groups assigned to the one of the plurality system event attributes associated with the data element; and
        determine which data group of the set of data groups corresponds to the data element; and
        associate the corresponding one of the set of data groups to the data element.

\* \* \* \* \*